(12) United States Patent
Tanaka

(10) Patent No.: US 10,974,768 B2
(45) Date of Patent: Apr. 13, 2021

(54) VEHICLE CABIN FRONT PORTION STRUCTURE

(71) Applicant: Toyota Jidosha Kabushiki Kaisha, Toyota (JP)

(72) Inventor: Yoko Tanaka, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 133 days.

(21) Appl. No.: 16/527,786

(22) Filed: Jul. 31, 2019

(65) Prior Publication Data

US 2020/0047813 A1 Feb. 13, 2020

(30) Foreign Application Priority Data

Aug. 10, 2018 (JP) .............................. JP2018-152064

(51) Int. Cl.
*B60J 7/00* (2006.01)
*B62D 25/08* (2006.01)
*B62D 25/20* (2006.01)

(52) U.S. Cl.
CPC ......... *B62D 25/08* (2013.01); *B62D 25/2018* (2013.01)

(58) Field of Classification Search
CPC ....... Y02T 10/64; Y02T 10/72; Y02T 10/645; Y02T 10/70; B60L 2200/26; B60R 21/206; B60R 2021/23169; B60R 21/233; B60R 21/2338; B60R 2021/0051
See application file for complete search history.

(56) References Cited

U.S. PATENT DOCUMENTS

| | | | | |
|---|---|---|---|---|
| 5,088,571 A | * | 2/1992 | Burry | B60K 37/00 180/90 |
| 7,744,117 B2 | * | 6/2010 | Fukawatase | B60R 21/2338 280/730.1 |
| 8,128,122 B2 | * | 3/2012 | Fukawatase | B60R 21/203 280/730.1 |
| 8,220,828 B2 | * | 7/2012 | Fukawatase | B60R 21/203 280/730.1 |
| 10,494,032 B2 | * | 12/2019 | Mullen | B62D 29/04 |
| 2002/0171230 A1 | * | 11/2002 | Takimoto | B60R 21/233 280/730.1 |
| 2002/0171231 A1 | * | 11/2002 | Takimoto | B60R 21/2338 280/730.1 |
| 2003/0094795 A1 | * | 5/2003 | Takimoto | B60R 21/206 280/730.1 |

(Continued)

FOREIGN PATENT DOCUMENTS

| | | |
|---|---|---|
| JP | 2000326722 A | 11/2000 |
| JP | 2009214808 A | 9/2009 |

*Primary Examiner* — Kiran B Patel
(74) *Attorney, Agent, or Firm* — Dinsmore & Shohl LLP

(57) ABSTRACT

A vehicle cabin front portion structure has a steering column of a vehicle, an instrument panel in which a face blowout port is formed further toward a vehicle transverse direction outer side than the steering column, an air conditioner main body that is provided within the instrument panel, further toward a vehicle transverse direction central side than the steering column, a knee airbag device that is disposed at a vehicle lower side of the steering column, and that inflates and deploys a knee airbag toward a vehicle lower side of the instrument panel, and a face duct that extends from the air conditioner main body to the face blowout port via a route that passes a vehicle rear side of the knee airbag device.

8 Claims, 9 Drawing Sheets

(56) References Cited

U.S. PATENT DOCUMENTS

| | | | |
|---|---|---|---|
| 2003/0120409 A1* | 6/2003 | Takimoto | B60R 21/233 280/730.1 |
| 2003/0132617 A1* | 7/2003 | Takimoto | B60R 21/2346 280/730.1 |
| 2003/0132618 A1* | 7/2003 | Suzuki | B60R 21/2165 280/730.1 |
| 2004/0075253 A1* | 4/2004 | Morita | B60R 21/2171 280/730.1 |
| 2004/0164527 A1* | 8/2004 | Nagata | B60R 21/2338 280/730.1 |
| 2004/0245750 A1* | 12/2004 | Takimoto | B60R 21/206 280/730.1 |
| 2004/0262896 A1* | 12/2004 | Mizuno | B60R 21/206 280/730.1 |
| 2005/0006880 A1* | 1/2005 | Nakayama | B60R 21/231 280/730.1 |
| 2005/0062265 A1* | 3/2005 | Hotta | B60R 21/206 280/730.1 |
| 2005/0073134 A1* | 4/2005 | Matsuura | B60R 21/206 280/730.1 |
| 2005/0107729 A1* | 5/2005 | Hayakawa | B60R 21/206 602/26 |
| 2005/0140123 A1* | 6/2005 | Hotta | B60R 21/2171 280/730.1 |
| 2005/0151352 A1* | 7/2005 | Abe | B60R 21/237 280/730.1 |
| 2005/0230939 A1* | 10/2005 | Abe | B60R 21/206 280/728.2 |
| 2006/0043713 A1* | 3/2006 | Kuriyama | B60R 21/01554 280/735 |
| 2006/0071459 A1* | 4/2006 | Hayakawa | B60R 21/206 280/730.1 |
| 2006/0108780 A1* | 5/2006 | Hotta | B60R 21/206 280/732 |
| 2006/0186650 A1* | 8/2006 | Kuwano | B60H 1/0055 280/732 |
| 2006/0279073 A1* | 12/2006 | Hotta | B60R 21/217 280/730.1 |
| 2007/0045998 A1* | 3/2007 | Kashiwagi | B60R 21/231 280/730.1 |
| 2007/0182134 A1* | 8/2007 | Mizuno | B60R 21/237 280/730.1 |
| 2007/0200320 A1* | 8/2007 | Keshavaraj | B60R 21/239 280/730.1 |
| 2007/0200322 A1* | 8/2007 | Sakakida | B60R 21/206 280/730.1 |
| 2008/0100042 A1* | 5/2008 | Adachi | B60R 21/2171 280/730.1 |
| 2008/0106078 A1* | 5/2008 | Fukawatase | B60R 21/233 280/730.1 |
| 2008/0106079 A1* | 5/2008 | Fukawatase | B60R 21/203 280/730.1 |
| 2008/0111353 A1* | 5/2008 | Fukawatase | B60R 21/261 280/730.1 |
| 2008/0116669 A1* | 5/2008 | Adachi | B60R 21/2338 280/730.1 |
| 2008/0122204 A1* | 5/2008 | Fukawatase | B60R 21/2165 280/728.3 |
| 2008/0122205 A1* | 5/2008 | Imamura | B60R 21/203 280/730.1 |
| 2008/0174091 A1* | 7/2008 | Hoshino | B60R 21/206 280/728.3 |
| 2008/0211212 A1* | 9/2008 | Adachi | B60R 21/2032 280/731 |
| 2008/0217888 A1* | 9/2008 | Fukawatase | B60R 21/2032 280/730.1 |
| 2008/0217890 A1* | 9/2008 | Fukawatase | B62D 1/197 280/731 |
| 2008/0238048 A1* | 10/2008 | Ishida | B60R 21/206 280/728.2 |
| 2009/0079170 A1* | 3/2009 | Bito | B60R 7/06 280/730.1 |
| 2009/0085333 A1* | 4/2009 | Imaeda | B60R 21/2032 280/730.1 |
| 2009/0152839 A1* | 6/2009 | Thomas | B60R 21/215 280/728.2 |
| 2009/0174173 A1* | 7/2009 | Adachi | B60R 21/206 280/730.1 |
| 2009/0230661 A1* | 9/2009 | Fukawatase | B60R 21/237 280/730.1 |
| 2009/0302585 A1* | 12/2009 | Ishida | B60R 21/2032 280/730.1 |
| 2010/0013200 A1* | 1/2010 | Fukawatase | B60R 21/206 280/730.1 |
| 2010/0096841 A1* | 4/2010 | Tanaka | B60R 21/2032 280/730.1 |
| 2010/0164212 A1* | 7/2010 | Nakayama | B60R 21/2338 280/743.2 |
| 2010/0194081 A1* | 8/2010 | Thomas | B60R 21/16 280/730.1 |
| 2011/0049847 A1* | 3/2011 | Adachi | B60R 21/215 280/730.1 |
| 2011/0109070 A1* | 5/2011 | Tanaka | B60R 21/2334 280/741 |
| 2014/0291972 A1* | 10/2014 | Fukawatase | B60R 21/206 280/729 |
| 2015/0091276 A1* | 4/2015 | Ando | B60R 21/206 280/728.3 |
| 2016/0052479 A1* | 2/2016 | Komatsu | B60R 21/233 280/730.1 |
| 2016/0068131 A1* | 3/2016 | Komatsu | B60R 21/206 280/730.1 |
| 2016/0244016 A1* | 8/2016 | Takeshita | B60R 21/231 |
| 2017/0088081 A1* | 3/2017 | Kojima | B60R 21/2171 |
| 2018/0118149 A1* | 5/2018 | Odai | B60R 21/20 |
| 2018/0244234 A1* | 8/2018 | Anae | B60R 21/206 |
| 2018/0272982 A1* | 9/2018 | Yamauchi | B60R 21/215 |
| 2018/0281732 A1* | 10/2018 | Shigemura | B60R 21/231 |
| 2018/0281733 A1* | 10/2018 | Shigemura | B60R 21/2171 |
| 2018/0281734 A1* | 10/2018 | Shigemura | B60R 21/206 |
| 2018/0281735 A1* | 10/2018 | Shigemura | B60R 21/206 |
| 2019/0054883 A1* | 2/2019 | Kitagawa | B60R 21/206 |
| 2019/0054886 A1* | 2/2019 | Ono | B60R 21/206 |
| 2019/0054888 A1* | 2/2019 | Fukawatase | B60R 21/232 |
| 2020/0094765 A1* | 3/2020 | Kimura | B60R 21/2338 |
| 2020/0148153 A1* | 5/2020 | Hioda | B60R 21/215 |
| 2020/0276953 A1* | 9/2020 | Enders | B60R 21/206 |

* cited by examiner

VEHICLE CABIN FRONT PORTION STRUCTURE

CROSS-REFERENCE TO RELATED APPLICATION

This application is based on and claims priority under 35 USC 119 from Japanese Patent Application No. 2018-152064, filed on Aug. 10, 2018, the disclosure of which is incorporated by reference herein.

BACKGROUND

Technical Field

The present disclosure relates to a vehicle cabin front portion structure.

Related Art

In the air conditioner duct structure disclosed in Japanese Patent Application Laid-Open (JP-A) No. 2000-326722, air blowout ports are provided at the center and at the left and the right of an instrument panel. The duct that is provided at the interior of the instrument panel is structured from a horizontal portion and branch portions that head from the horizontal portion to the blowout ports, and the left and right blowout ports are symmetrical across the central portion of the horizontal portion of the duct. Further, the entirety of the horizontal portion and the branch portions of the duct is disposed at the upper side of a cross member that spans between the left and right side walls of the vehicle body. Due thereto, the air conditioner duct structure does not affect the layout of mechanisms such as the steering shaft and the like.

By the way, in a vehicle in which a knee airbag device is disposed at the vehicle lower side of the steering column, there are cases in which the face duct of the air conditioner is shaped so as to be bent toward the vehicle front side so as to detour around the knee airbag device. In such a case, the air feed path of the face duct is long, and therefore, the pressure loss at the face duct increases, the air feeding performance decreases, and accordingly, this becomes a cause of a deterioration in the fuel efficiency of the vehicle.

SUMMARY in view of the above-described circumstances, an object of the present disclosure is to provide a vehicle cabin front portion structure that, in a structure in which a knee airbag device is disposed at the vehicle lower side of a steering column, can devise shortening of a face duct.

A vehicle cabin front portion structure of a first aspect of the present disclosure has a steering column of a vehicle, an instrument panel in which a face blowout port is formed further toward a vehicle transverse direction outer side than the steering column, an air conditioner main body that is provided within the instrument panel, further toward a vehicle transverse direction central side than the steering column, a knee airbag device that is disposed at a vehicle lower side of the steering column, and that inflates and deploys a knee airbag toward a vehicle lower side of the instrument panel, and a face duct that extends from the air conditioner main body to the face blowout port via a route that passes a vehicle rear side of the knee airbag device.

In accordance with the first aspect, the face blowout port is formed in the instrument panel at further toward the vehicle transverse direction outer side than the steering column. Further, the air conditioner main body is provided within the instrument panel at further toward the vehicle transverse direction central side than the steering column. The knee airbag device is disposed at the vehicle lower side of the steering column. The knee airbag device is structured so as to inflate and deploy a knee airbag toward the vehicle lower side of the instrument panel. Therefore, as compared with a knee airbag device that inflates and deploys a knee airbag toward the vehicle rear side of the instrument panel, the knee airbag device can be disposed at the vehicle front side. Further, the face duct extends from the air conditioner main body toward the face blowout port via a route that passes the vehicle rear side of the knee airbag device. Because the vehicle cabin front portion structure is structured in this way, the face duct can be shortened as compared with a structure in which the face duct extends from the air conditioner main body to the face blowout port via a route that passes the vehicle front side of the knee airbag device.

A vehicle cabin front portion structure of a second aspect of the present disclosure further has, in the first aspect, a foot duct that extends from the air conditioner main body toward a vehicle front side of the knee airbag device.

In the second aspect, the face duct extends toward the vehicle rear side of the knee airbag device, and the foot duct extends toward the vehicle front side of the knee airbag device. In this way, the face duct and the foot duct are routed separately at the vehicle longitudinal direction both sides of the knee airbag device, and therefore, it is easy to ensure space for placement of these ducts.

In a vehicle cabin front portion structure of a third aspect of the present disclosure, in the second aspect, the steering column has a reaction motor that is disposed at a vehicle upper side of the foot duct.

In accordance with the third aspect, the reaction motor that the steering column has is disposed at the vehicle upper side of the foot duct that extends toward the vehicle front side of the knee airbag device. In such a structure, there are cases in which it is difficult to ensure space for placement of the face duct at the vehicle front side of the knee airbag device. However, in the present disclosure, the face duct extends toward the vehicle rear side of the knee airbag device. Due thereto, it is easy to ensure space for placement of the face duct, the foot duct and the reaction motor.

In a vehicle cabin front portion structure of a fourth aspect of the present disclosure, in the first aspect, an opening portion through which the steering column is inserted is formed in the instrument panel, and a gap is formed between a lower surface of a column cover of the steering column and a lower edge portion of the opening portion, and a portion of the face duct is interposed between the gap and the knee airbag device.

In accordance with the fourth aspect, the steering column is inserted through the opening portion that is formed in the instrument panel. A gap is formed between the lower surface of the column cover of the steering column and the lower edge portion of the opening portion. A portion of the face duct is interposed between this gap and the knee airbag device. Due thereto, it can be made such that the knee airbag device, which is generally structured to include metal parts, cannot be seen through this gap from the vehicle cabin side. Therefore, members that are used exclusively for preventing such viewing are not needed.

In a vehicle cabin front portion structure of a fifth aspect of the present disclosure, in the first aspect, a region of the instrument panel, which is at a vehicle rear side of the knee airbag device, is an inclined wall that is inclined so as to slope upwardly toward a vehicle rear side, and a rear wall of the face duct, which faces the inclined wall from a vehicle front side, is inclined so as to run along the inclined wall.

In the fifth aspect, the rear wall of the face duct, which faces the inclined wall of the instrument panel from the vehicle front side, is inclined so as to run along the inclined wall. Due thereto, it is easy to ensure the sectional surface area of the face duct between the inclined wall and the knee airbag device.

In a vehicle cabin front portion structure of a sixth aspect of the present disclosure, in the first aspect, the face duct has an extended portion that extends toward a vehicle upper side of the knee airbag device.

In the sixth aspect, the extended portion that the face duct has is disposed in the space between the steering column and the knee airbag device. Owing to this extended portion, it is easy to ensure the sectional surface area of the face duct.

As described above, in the vehicle cabin front portion structure relating to the present disclosure, shortening of the face duct can be devised in a structure in which the knee airbag device is disposed at the vehicle lower side of the steering column.

BRIEF DESCRIPTION OF THE DRAWINGS

Exemplary embodiments of the present disclosure will be described in detail based on the following figures, wherein.

DETAILED DESCRIPTION

Figure 1:
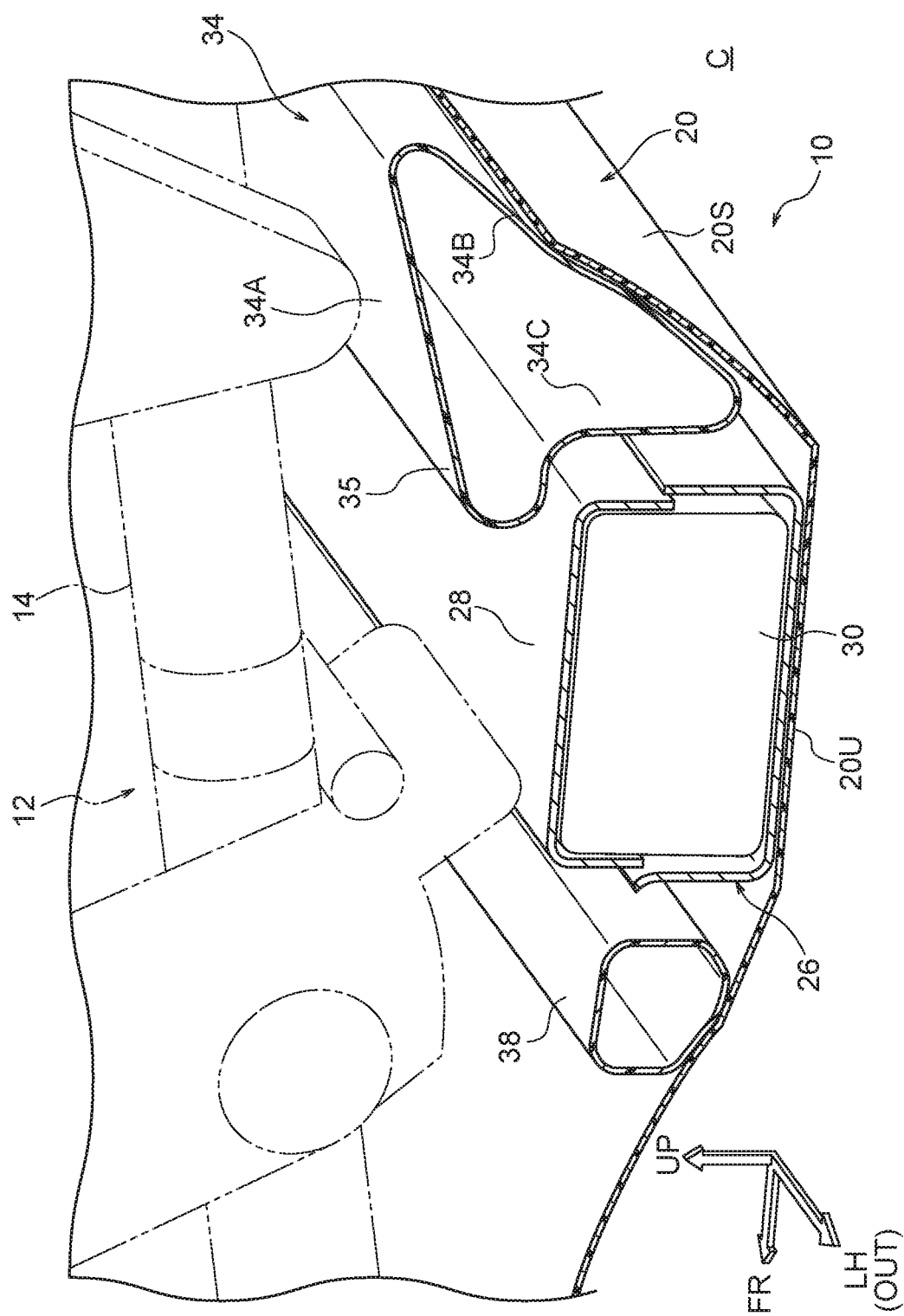
FIG. 1 is a perspective sectional view showing a portion of a vehicle cabin front portion structure relating to an embodiment of the present disclosure.
Figure 2:
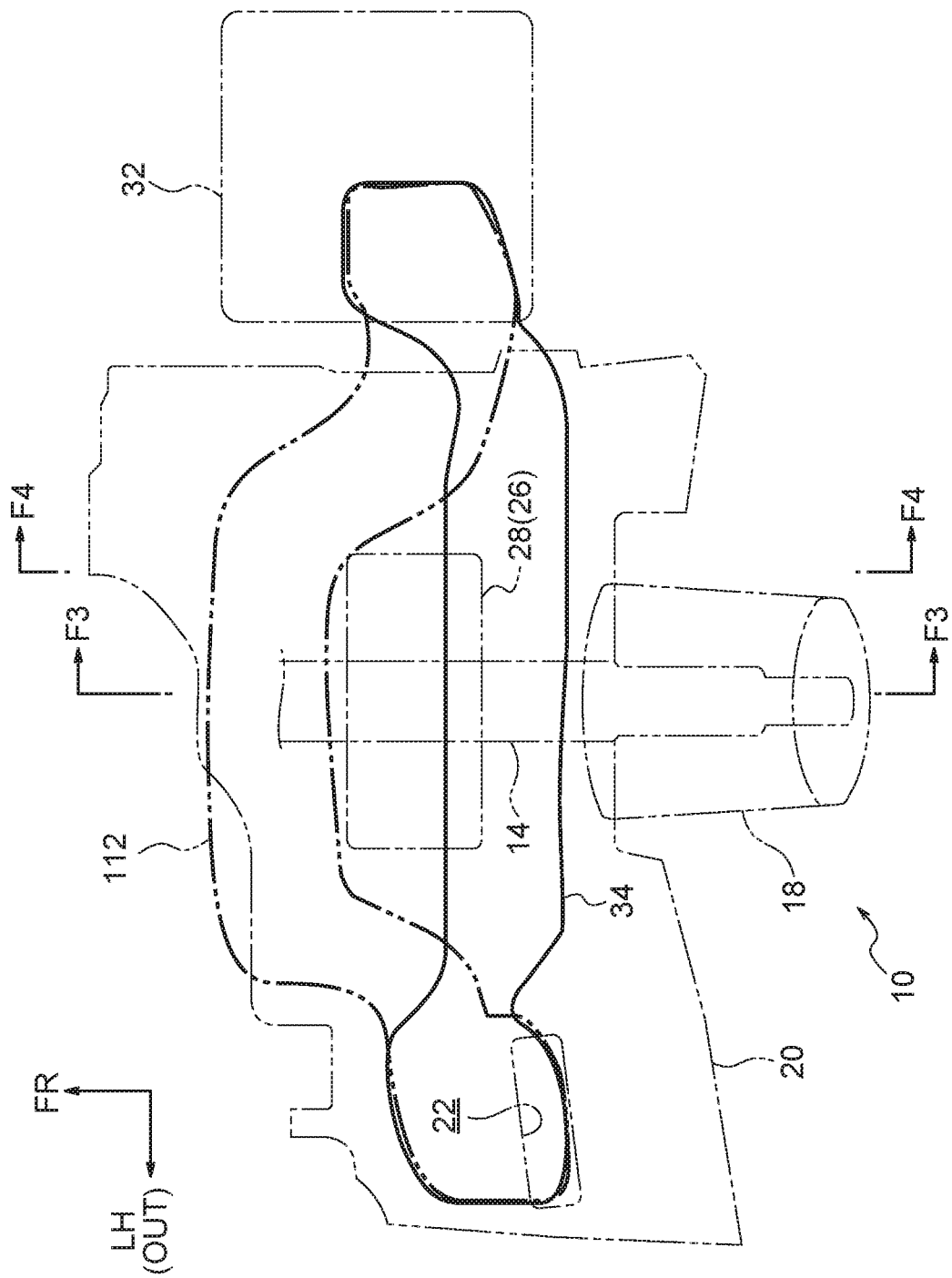
FIG. 2 is a plan view schematically showing a portion of the vehicle cabin front portion structure relating to the embodiment of the present disclosure.

A vehicle cabin front portion structure 10 relating to an embodiment of the present disclosure is described hereinafter by using FIG. 1 through FIG. 5. Note that arrow FR, arrow UP and arrow LH (OUT) that are shown appropriately in the respective drawings indicate the forward direction, the upward direction and the leftward direction (the vehicle transverse direction outer side), respectively. Hereinafter, when description is given by merely using longitudinal, left-right and vertical directions, they refer to the longitudinal of the vehicle longitudinal direction, the left and the right of the vehicle left-right direction (the vehicle transverse direction), and the vertical of the vehicle vertical direction, unless otherwise indicated.

(Structure) As shown in FIG. 1 through FIG. 4, the vehicle cabin front portion structure 10 relating to the present embodiment is applied to a so-called left-hand-drive vehicle (automobile), and has a steering column 12, an instrument panel 20 at which a face blowout port 22 (see FIG. 2) is formed further toward the vehicle transverse direction outer side than the steering column 12, a knee airbag device 26 that is disposed at the vehicle lower side of the steering column 12 and inflates and deploys a knee airbag 30 toward the vehicle lower side of the instrument panel 20, an HVAC (Heating, Ventilation, and Air Conditioning) unit 32 (see FIG. 2) that is provided within the instrument panel 20 at further toward the vehicle transverse direction central side than the steering column 12, a left face duct 34 that extends from the HVAC unit 32 toward the face blowout port 22 via a route that passes the vehicle rear side of the knee airbag device 26, and a left foot duct 38 (not shown in FIG. 2) that extends from the HVAC unit 32 toward the vehicle front side of the knee airbag device 26.

The HVAC unit 32 corresponds to the "air conditioner main body" in the present disclosure. The left face duct 34 corresponds to the "face duct" in the present disclosure. The left foot duct 38 corresponds to the "foot duct" in the present disclosure. Note that, in FIG. 2, only the left side portion of the instrument panel 20 is illustrated, and a left face duct (face duct) 112 relating to a comparative example (conventional example) 100 is shown by the two-dot chain line. Further, in a case in which the vehicle is a so-called right-hand-drive vehicle, the structure has left-right symmetry with respect to that of the present embodiment. The aforementioned respective structural elements are described in detail hereinafter.

The steering column 12 is a steer-by-wire type column that can independently control the steering of an unillustrated steering wheel and changes in the turning angles of unillustrated tires. This steering column 12 has a column main body 14 that is structured to include an unillustrated steering shaft, a reaction motor 16 (refer to FIG. 4, not shown in FIG. 2), and a column cover 18 (refer to FIG. 2, FIG. 3 and FIG. 5). Note that, in FIG. 1 through FIG. 4, the column main body 14 and peripheral members thereof, and the reaction motor 16, are shown schematically by two-dot chain lines. Further, the above-described steering shaft is positioned in the cross-section shown in FIG. 3.

The column main body 14 is inserted-through an opening portion 24 (see FIG. 3 through FIG. 5) that is formed in the instrument panel 20. The region, which is positioned at a vehicle cabin C side, of the column main body 14 is covered by the column cover 18. The column cover 18 is formed from resin for example, and the vehicle front side region thereof is inserted through the aforementioned opening portion 24. The reaction motor 16 is an EPS (electric power steering) motor that imparts steering reaction force to the steering shaft in accordance with the steering of the steering wheel. Note that, at the instrument panel 20, the region, which is further toward the vehicle lower side than the opening portion 24 and is further toward the vehicle rear side than the knee airbag device 26, is an inclined wall 20S that is inclined so as to slope upwardly toward the vehicle rear side.

The knee airbag device 26 is a so-called downwardly-deploying knee airbag device, and is disposed at the vehicle lower side of the steering column 12 and in a vicinity above a lower wall 20U of the instrument panel 20. The knee airbag device 26 is structured to include an airbag case 28 that is formed in the shape of a rectangular parallelepiped that is hollow, the knee airbag 30 that is accommodated within the airbag case 28 in a folded-up state, and an unillustrated inflator that is accommodated within the airbag case 28. Note that the knee airbag 30 is shown schematically in FIG. 1, FIG. 3 and FIG. 4.

The airbag case 28 and the inflator are fixed to (supported at) the steering column 12 via unillustrated brackets. At the time when a front collision of the vehicle is sensed, the knee airbag 30 receives a supply of gas from the inflator, and is inflated and deployed toward the vehicle lower side of the instrument panel 20, and restrains the knee portions of the driver and the periphery thereof from the vehicle front side. At a time at which the knee airbag 30 inflates and deploys, an airbag door (not shown in the drawings), which is formed at the lower wall 20U of the instrument panel 20 and the bottom wall of the airbag case 28, opens.

The HVAC unit 32 (see FIG. 2) is disposed at the vehicle transverse direction central side of the vehicle cabin front portion, at the inner side of the instrument panel 20 (i.e., between the instrument panel 20 and an unillustrated dash panel). The left face duct 34 and the left foot duct 38 extend out from the HVAC unit 32. Further, a right face duct, a right foot duct, a central duct, defroster ducts, and the like (none of which are illustrated) extend out from the HVAC unit 32. These respective ducts and the HVAC unit 32 are structural elements of the vehicle air conditioner.

The HVAC unit 32 has a fan, an evaporator, a heater core and the like, and adjusts the temperature, the humidity and the like of the airflow that is generated by the rotation of the fan. The airflow (air for air conditioning) that has been adjusted is selectively introduced into the interiors of any of the ducts among the above-described respective ducts by the operation of an unillustrated blowout port switching switch that is provided at the instrument panel 20.

The left face duct 34 (hereinafter, simply called "face duct 34") is formed in the shape of an elongated tube of resin for example, and is disposed with the length thereof being in the vehicle transverse direction. The face duct 34 extends from the upper end portion of the HVAC unit 32 toward the vehicle left side (vehicle transverse direction outer side). The distal end portion (vehicle transverse direction outer side end portion) of the face duct 34 is connected to an unillustrated side register that is provided at the left end portion (vehicle transverse direction outer side end portion) of the instrument panel 20. This side register forms the aforementioned face blowout port 22 (see FIG. 2). The air for air conditioning that has been introduced into the face duct 34 is blown out from the face blowout port 22 toward the vehicle cabin C side.

Figure 3:
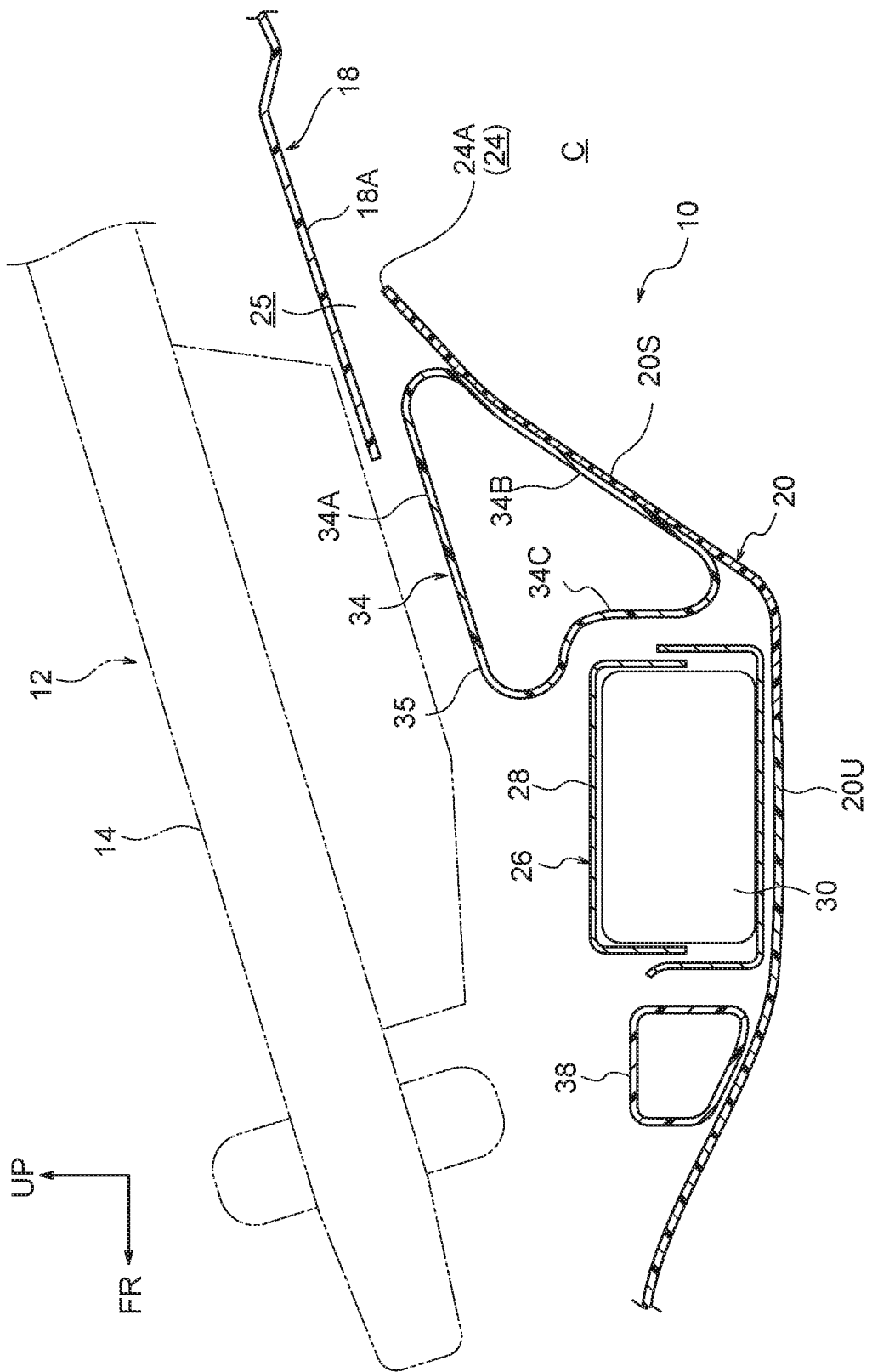
FIG. 3 is a cross-sectional view showing a cut plane that corresponds to line F3-F3 of FIG. 2.
Figure 4:
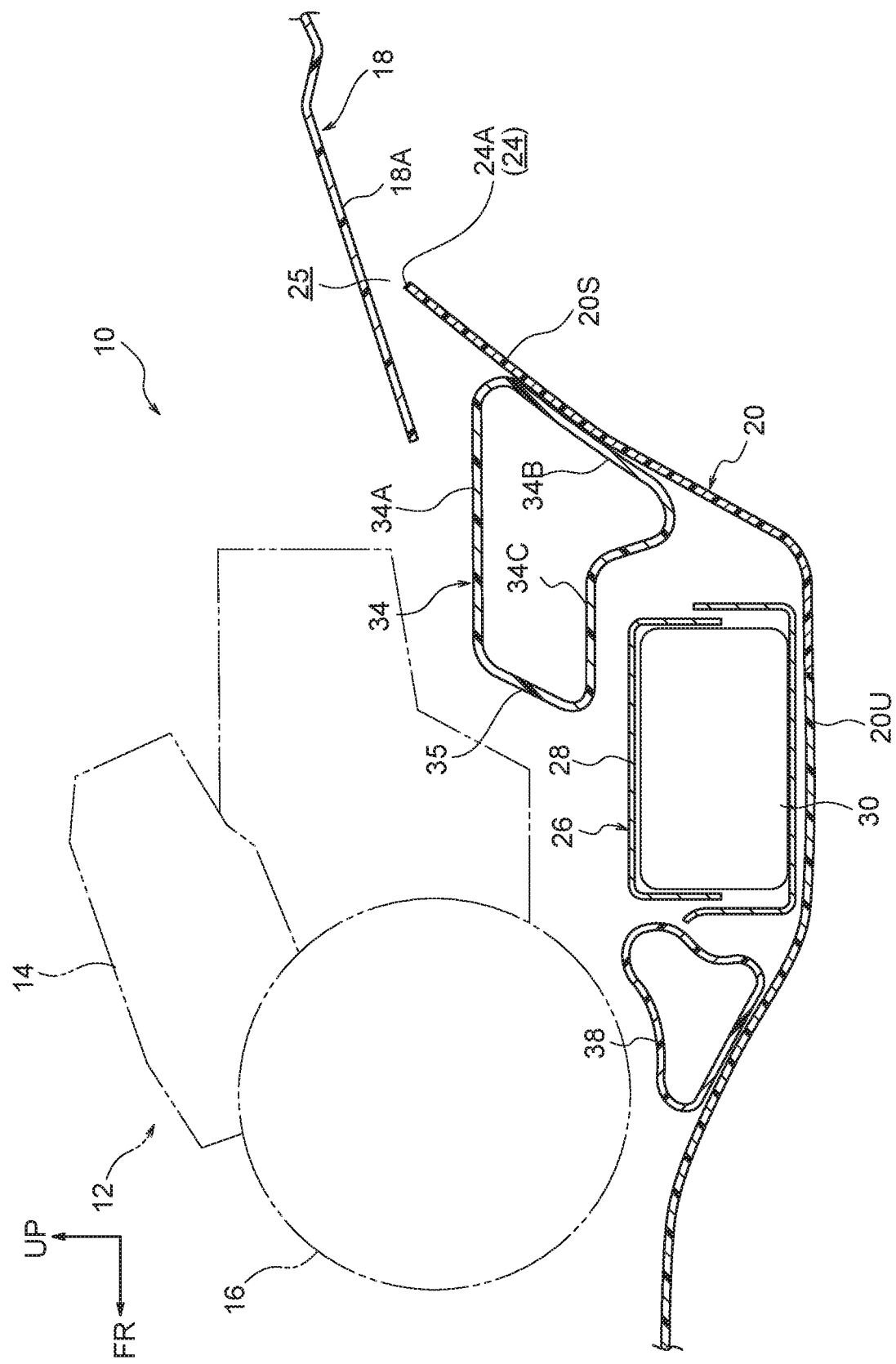
FIG. 4 is a cross-sectional view showing a cut plane that corresponds to line F4-F4 of FIG. 2.

This face duct 34 extends from the HVAC unit 32 toward the face blowout port 22 via a route that passes the vehicle lower side of the steering column 12 and the vehicle rear side of the knee airbag device 26. The length direction intermediate portion (here, the length direction central portion) of the face duct 34 is disposed between the inclined wall 20S of the instrument panel 20 and the knee airbag device 26, and extends in the vehicle transverse direction at the lower portion of the interior of the instrument panel 20. As shown in FIG. 3 and FIG. 4, the length direction intermediate portion of the face duct 34 is structured by an upper wall 34A that extends in the vehicle longitudinal direction or substantially in the vehicle longitudinal direction as seen from the vehicle transverse direction, a rear wall 34B that extends from the rear end of the upper wall 34A at an incline toward the vehicle lower side and the vehicle front side, and a front wall 34C that vertically connects the front end of the upper wall 34A and the front end of the rear wall 34B. However, as shown in FIG. 3 and FIG. 4, the cross-sections, as seen from the vehicle transverse direction, of the length direction intermediate portion of the face duct 34 are formed in different shapes due to the relationship with peripheral members and the like, and the cross-sectional shape varies in the vehicle transverse direction.

Concretely, in the cross-section that is shown in FIG. 3 (i.e., the cross-section where the unillustrated steering shaft is positioned), the upper wall 34A is inclined so as to rise gently toward the vehicle rear side. Further, in the cross-section that is shown in FIG. 4 (i.e., a cross-section that is slightly further toward the vehicle transverse direction central side than the steering shaft), the upper wall 34A extends in the vehicle longitudinal direction. In both of the cross-sections that are shown in FIG. 3 and FIG. 4, the rear wall 34B is inclined so as to run along the inclined wall 20S of the instrument panel 20 (i.e., is inclined so as to slope upwardly toward the vehicle rear side), but, in the cross-section shown in FIG. 3, the rear wall 34B is longer than in the cross-section shown in FIG. 4. The rear wall 34B is adjacent to and faces the inclined wall 20S from the vehicle front side. The front wall 34C is bent substantially in the shape of a crank as seen from the vehicle transverse direction, such that the upper portion thereof projects out further toward the vehicle front side than the lower portion. Due thereto, an extended portion 35 that extends toward the vehicle upper side of the knee airbag device 26 is provided at the length direction intermediate portion of the face duct 34. In the cross-section shown in FIG. 4, this extended portion 35 is larger than in the cross-section shown in FIG. 3.

Figure 5:
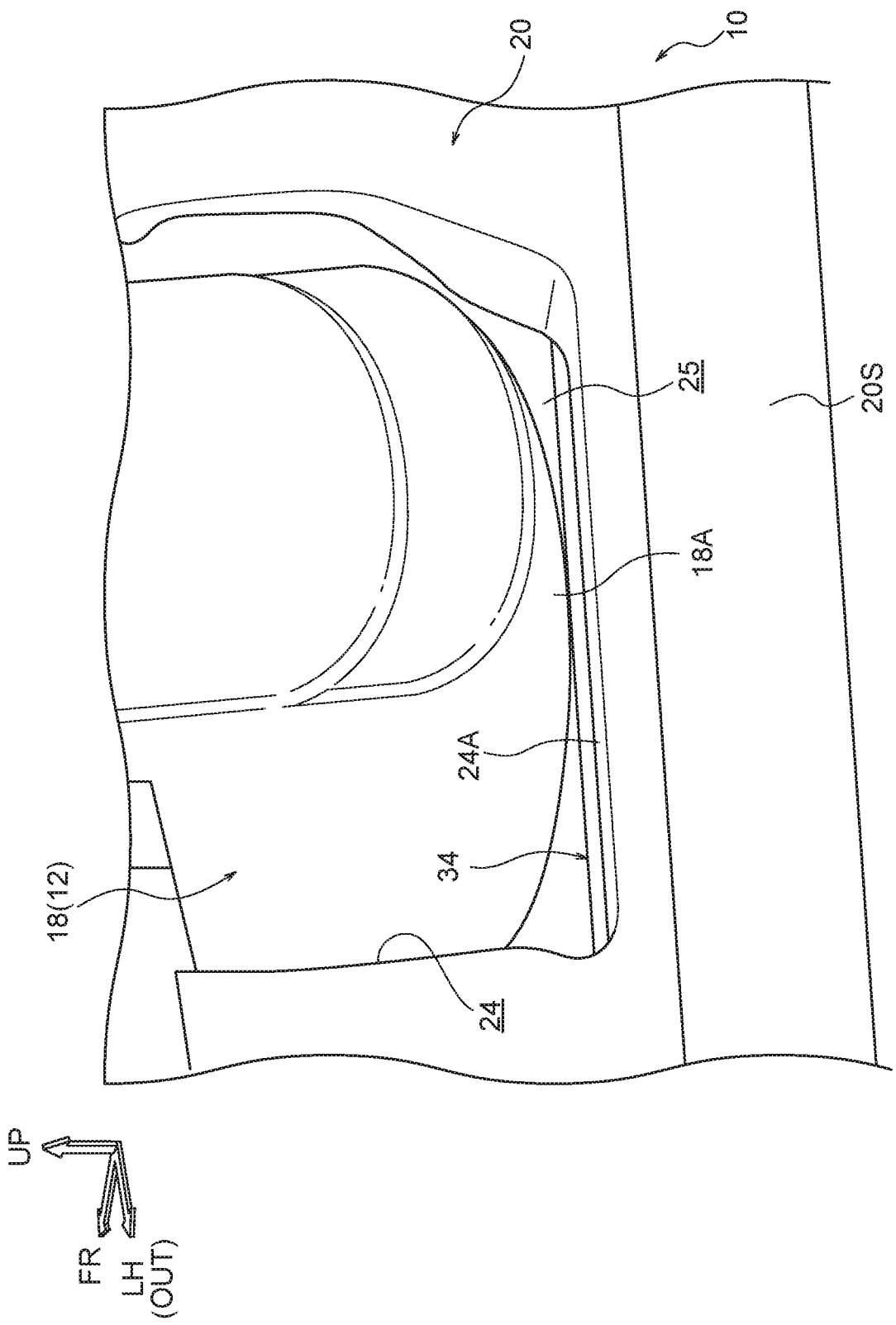
FIG. 5 is a perspective view in which a portion of the vehicle cabin front portion structure relating to the embodiment of the present disclosure is seen from a vehicle rear side and a vehicle left side.
Figure 6:
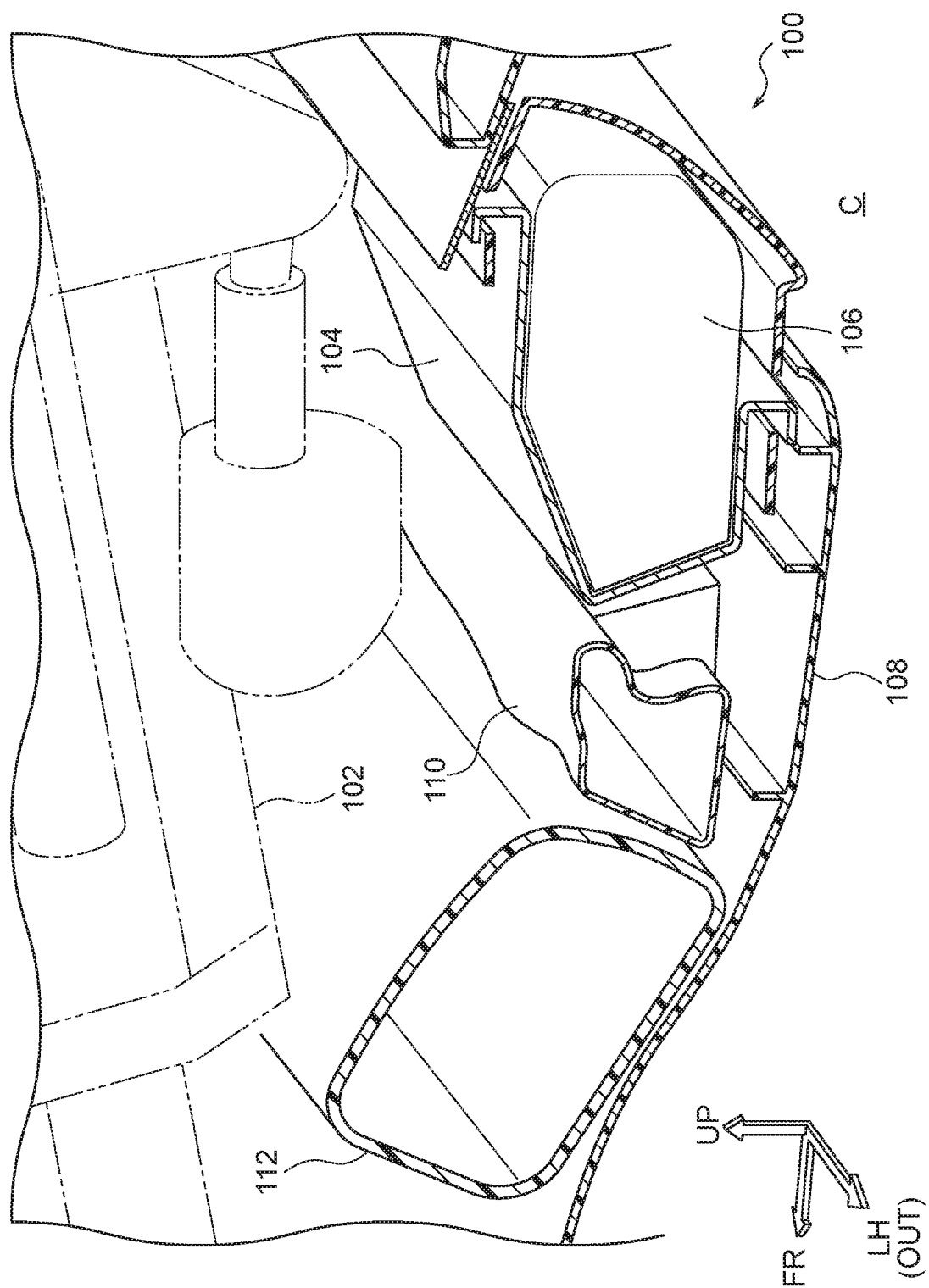
FIG. 6 is a perspective sectional view that corresponds to FIG. 1 and shows a portion of a vehicle cabin front portion structure relating to a comparative example.

As shown in FIG. 3 and FIG. 5, a gap 25 that extends in the vehicle transverse direction is formed between a lower surface 18A of the above-described column cover 18 and a lower edge portion 24A of the opening portion 24 of the instrument panel 20. A portion of the length direction intermediate portion of the face duct 34 is interposed between this gap 25 and the knee airbag device 26. Due thereto, the knee airbag device 26 cannot be seen through the gap 25 from the vehicle cabin C side.

The left foot duct 38 (hereinafter simply called "foot duct" 38) that is shown in FIG. 3 and FIG. 4 is formed in the shape of an elongated tube of resin for example, and is disposed with the length thereof being in the vehicle transverse direction. As described above, the foot duct 38 extends from the HVAC unit 32 toward the vehicle front side of the knee airbag device 26, and extends in the vehicle transverse direction at the lower portion of the instrument panel 20 interior. Plural blowout ports (not illustrated) that open downward are formed in the foot duct 38 so as to be lined up in the vehicle transverse direction. The air for air conditioning that has been introduced into the foot duct 38 interior is blown out toward the vehicle lower side from these plural blowout ports.

The cross-sections, as seen from the vehicle transverse direction, of the length direction intermediate portion of the foot duct 38 are formed in different shapes due to the relationship with peripheral members and the like, and the cross-sectional shape varies in the vehicle transverse direction. Concretely, in the cross-section that is shown in FIG. 3, the foot duct 38 is a substantially rectangular shape. Further, in the cross-section shown in FIG. 4, the foot duct 38 is a substantially upside-down triangular shape. As shown in FIG. 4, the reaction motor 16 is disposed above the foot duct 38. The upper wall (upper surface) of the foot duct 38 is recessed toward the vehicle lower side as seen in the vehicle transverse direction, so as to run along the outer peripheral surface of the reaction motor 16.

(Operation and Effects)

Operation and effects of the present embodiment are described next.

In the vehicle cabin front portion structure 10 of the above-described structure, the face blowout port 22 is formed in the instrument panel 20 at further toward the vehicle transverse direction outer side than the steering column 12. Further, the HVAC unit 32 is provided within the instrument panel 20 at further toward the vehicle transverse direction central side than the steering column 12. The knee airbag device 26 is disposed at the vehicle lower side of the steering column 12. Because this knee airbag device 26 is structured so as to inflate and deploy the knee airbag 30 toward the vehicle lower side, the knee airbag device 26 can be placed further toward the vehicle front side as compared with a knee airbag device that inflates and deploys the knee airbag toward the vehicle rear side. Further, the face duct 34 extends from the HVAC unit 32 toward the face blowout port 22 via a route that passes the vehicle rear side of the knee airbag device 26. Because the vehicle cabin front portion structure 10 is structured in this way, the face duct 34 can be made to be short as compared with a structure in which the face duct extends from the HVAC unit (the air conditioner main body) toward the face blowout port via a route that passes the vehicle front side of the knee airbag device.

The above-described result is explained in further detail by using the comparative example (conventional example) 100 that is shown in FIG. 6 through FIG. 9. In this comparative example 100, a so-called rearwardly-deploying knee airbag device 104 is disposed at the vehicle lower side of a steering column 102. This knee airbag device 104 is disposed at the lower portion of the interior of an instrument panel 108, and is structured so as to inflate and deploy a knee airbag 106 toward the vehicle rear side. Further, in this comparative example 100, a foot duct 110 extends toward the vehicle front side of the knee airbag device 104, and the length direction intermediate portion of the face duct 112 is disposed at the vehicle front side of the foot duct 110. As shown by the two-dot chain line in FIG. 2, the face duct 112 extends from the HVAC unit 32 toward the face blowout port 22 via a route that passes the vehicle front side of the knee airbag device 104. Therefore, the face duct 112 is made to be a shape that is bent toward the vehicle front side, in order to detour around the knee airbag device 104. As a result, in this comparative example 100, the air feed path of the face duct 112 is long as compared with in the present embodiment. Therefore, the pressure loss at the face duct 112 increases, the air feeding performance deteriorates, and this becomes a cause of a deterioration in the fuel efficiency of the vehicle. However, this can be avoided in the present embodiment.

Further, in the present embodiment, the face duct 34 extends toward the vehicle rear side of the knee airbag device 26, and the foot duct 38 extends toward the vehicle front side of the knee airbag device 26. In this way, the face duct 34 and the foot duct 38 are routed separately at the vehicle longitudinal direction both sides of the knee airbag device 26. Thus, it is easy to ensure space for the placement of these ducts 34, 38. Moreover, it is easy to place the downwardly-deploying knee airbag device 26 at an optimal position.

Moreover, in the present embodiment, the reaction motor 16 of the steer-by-wire-type steering column 12 is disposed at the vehicle upper side of the foot duct 38 that extends toward the vehicle front side of the knee airbag device 26. In such a structure, there are cases in which it is difficult to ensure space for placement of the face duct 34 at the vehicle front side of the knee airbag device 26. However, in the present embodiment, the face duct 34 extends toward the vehicle rear side of the knee airbag device 26. Due thereto, it is easy to ensure space for placement of the face duct 34, the foot duct 38, and the reaction motor 16.

Further, in the present embodiment, the steering column 12 is inserted through the opening portion 24 that is formed in the instrument panel 20, and the gap 25 is formed between the lower surface 18A of the column cover 18 of the steering column 12 and the lower edge portion 24A of the opening portion 24. A portion of the face duct 34 is interposed between this gap 25 and the knee airbag device 26. Due thereto, there is a structure in which the airbag case 28 of the knee airbag device 26, which is generally structured to include metal parts, is not seen through the gap 25 from the vehicle cabin C side. Therefore, members that are used exclusively for preventing such viewing are not needed.

Figure 7:
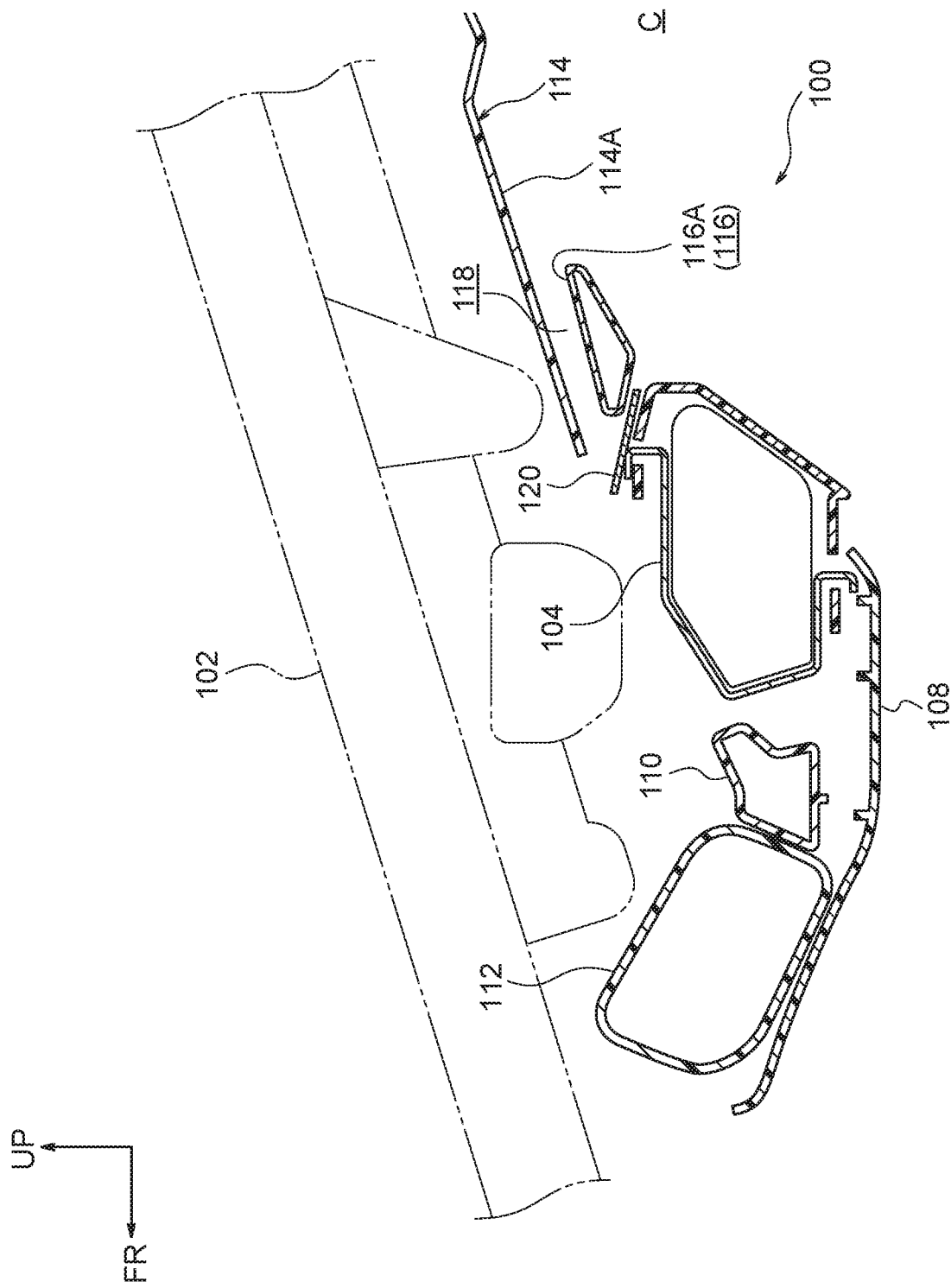
FIG. 7 is a cross-sectional view that corresponds to FIG. 3 and shows a portion of the vehicle cabin front portion structure relating to the comparative example.
Figure 8:
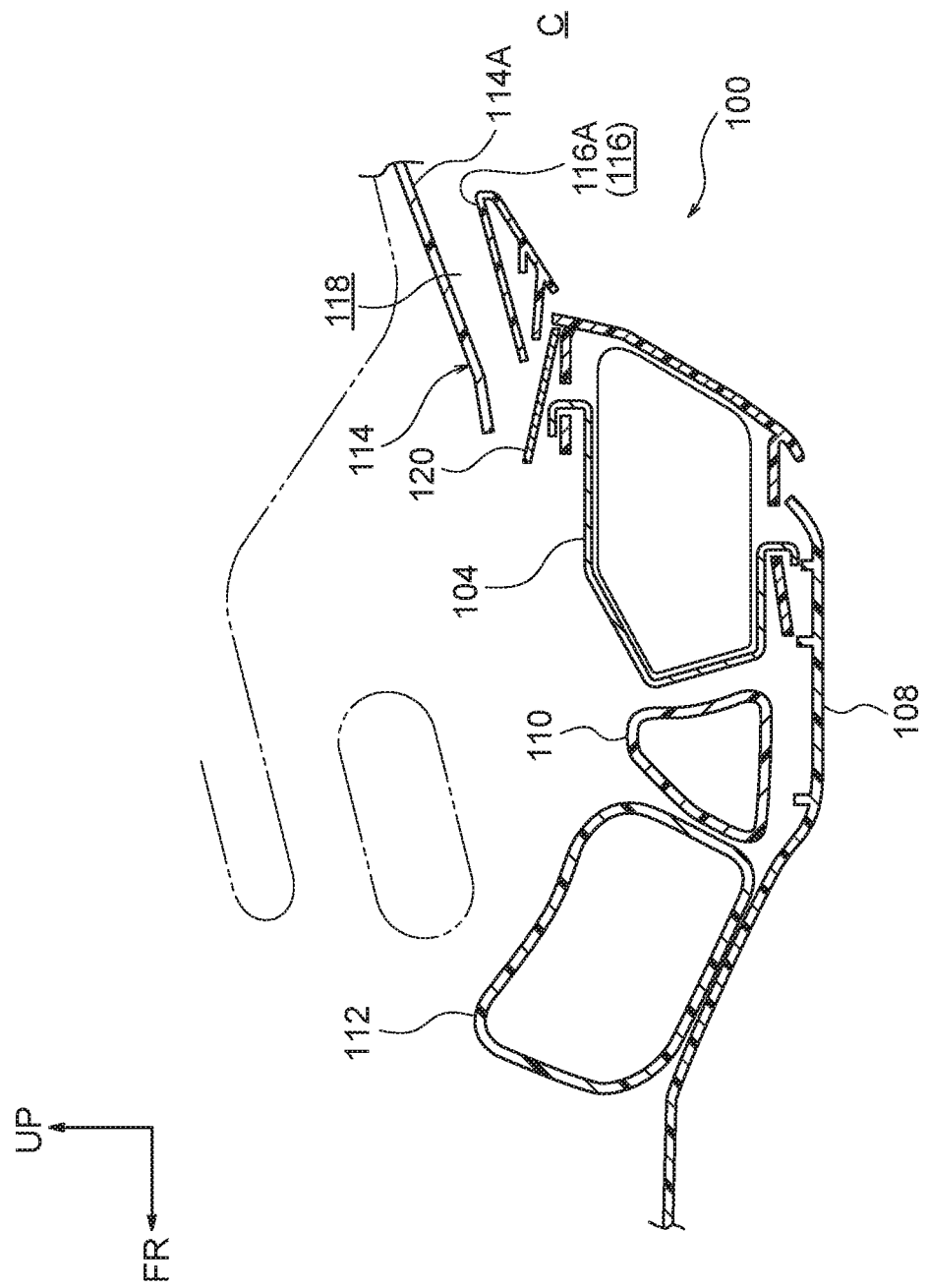
FIG. 8 is a cross-sectional view that corresponds to FIG. 4 and shows a portion of the vehicle cabin front portion structure relating to the comparative example.
Figure 9:
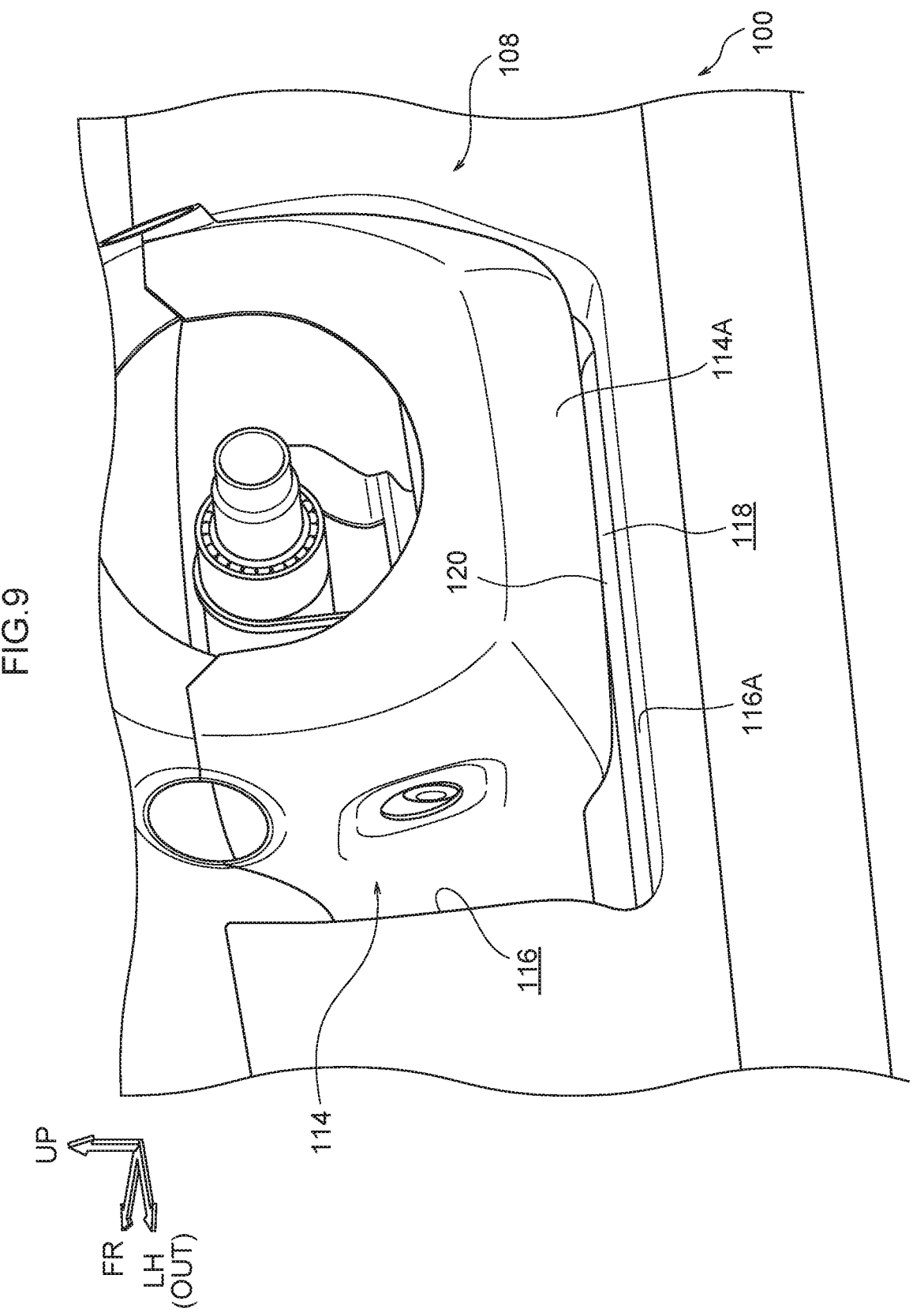
FIG. 9 is a perspective view that corresponds to FIG. 5 and shows a portion of the vehicle cabin front portion structure relating to the comparative example.

Namely, in the above-described comparative example 100, as shown in FIG. 7 through FIG. 9, a gap 118 is formed between a lower edge portion 116A of an opening portion 116 of the instrument panel 108 and a lower surface 114A of a column cover 114. However, a portion of the face duct 112 is not interposed between this gap 118 and the knee airbag device 104. Therefore, in this comparative example 100, a sheet-shaped dedicated member (concealing member) 120 is provided between the gap 118 and the knee airbag device 104 in order to make it such that the knee airbag device 104 cannot be seen through the gap 118 from the vehicle cabin C side. However, such a concealing member 120 is not needed in the present embodiment. As a result, the number of parts and the number of processes for assembling parts are few, and therefore, this contributes to a decrease in costs.

In the present embodiment, the region, which is at the vehicle rear side of the knee airbag device 26, at the instrument panel 20 is the inclined wall 20S that is inclined so as to slope upwardly toward the vehicle rear side. At the face duct 34, the rear wall 34B that faces the inclined wall 20S from the vehicle front side is inclined so as to run along the inclined wall 20S. Due thereto, it is easy to ensure a sufficient sectional surface area of the face duct 34 between the inclined wall 20S and the knee airbag device 26.

Moreover, in the present embodiment, the face duct 34 that is disposed at the vehicle rear side of the knee airbag device 26 has the extended portion 35 that extends toward the vehicle upper side of the knee airbag device 26. This extended portion 35 is disposed in the space between the steering column 12 and the knee airbag device 26. Owing to this extended portion 35, it is easy to ensure a sufficient sectional surface area of the face duct 34. Further, due to the sectional surface area of the face duct 34 being sufficiently ensured, the pressure loss of the air for air conditioning at the face duct 112 decreases, and the air feeding performance improves.

<Supplemental Description of Embodiment>

The above-described embodiment is structured such that the face duct 34 has the extended portion 35 that extends toward the vehicle upper side of the knee airbag device 26, and the rear wall 34B, which faces the inclined wall 20S of the instrument panel 20 from the vehicle front side, is inclined so as to run along the inclined wall 20S. However, the present disclosure is not limited to this. The shape of the face duct 34 can be changed appropriately in accordance with the shapes of the instrument panel 20 and the peripheral members thereof, and the like.

Further, the above embodiment is structured such that the gap 25 is formed between the lower surface 18A of the column cover 18 and the lower edge portion 24A of the opening portion 24 of the instrument panel 20, and, due to a portion of the face duct 34 being interposed between this gap 25 and the knee airbag device 26, the concealing member 120 such as that described above is omitted. However, the present disclosure is not limited to this, and, for example, may be a structure in which a portion of the face duct 34 is not interposed between the gap 25 and the knee airbag device 26, and the concealing member 120 such as that described above is provided. Further, for example, there may be a structure in which a peripheral member other than the face duct 34 is interposed between the gap 25 and the knee airbag device 26.

Although the above-described embodiment is structured such that the steering column 12 is a steer-by-wire type, the present disclosure is not limited to this, and the steering column may be a general mechanical type.

In addition, the present disclosure can be implemented by being modified in various ways within a scope that does not depart from the gist thereof. Further, the scope of the right of the present disclosure is, of course, not limited to the above-described embodiment.

What is claimed is:

1. A vehicle cabin front portion structure, comprising:
   a steering column of a vehicle;
   an instrument panel in which a face blowout port is formed further toward a vehicle transverse direction outer side than the steering column;
   an air conditioner main body that is provided, within the instrument panel, further toward a vehicle transverse direction central side than the steering column;
   a knee airbag device that is disposed at a vehicle lower side of the steering column, and that inflates and deploys a knee airbag toward a vehicle lower side of the instrument panel; and
   a face duct that extends from the air conditioner main body to the face blowout port via a route that passes a vehicle rear side of the knee airbag device.

2. The vehicle cabin front portion structure of claim 1, further comprising a foot duct that extends from the air conditioner main body toward a vehicle front side of the knee airbag device.

3. The vehicle cabin front portion structure of claim 2, wherein the steering column has a reaction motor that is disposed at a vehicle upper side of the foot duct.

4. The vehicle cabin front portion structure of claim 1, wherein an opening portion, through which the steering column is inserted, is formed in the instrument panel, and a gap is formed between a lower surface of a column cover of the steering column and a lower edge portion of the opening portion, and a portion of the face duct is interposed between the gap and the knee airbag device.

5. The vehicle cabin front portion structure of claim 1, wherein a region of the instrument panel, which is at a vehicle rear side of the knee airbag device, is an inclined wall that is inclined so as to slope upwardly toward a vehicle rear side, and a rear wall of the face duct, which faces the inclined wall from a vehicle front side, is inclined so as to run along the inclined wall.

6. The vehicle cabin front portion structure of claim 1, wherein the face duct has an extended portion that extends toward a vehicle upper side of the knee airbag device.

7. The vehicle cabin front portion structure of claim 5, wherein a length direction intermediate portion of the face duct is structured by:
   an upper wall that extends in a vehicle longitudinal direction as seen from a vehicle transverse direction;
   the rear wall, which extends from a rear end of the upper wall at an incline toward a vehicle lower side and a vehicle front side; and
   a front wall that vertically connects a front end of the upper wall and a front end of the rear wall.

8. The vehicle cabin front portion structure of claim 6, wherein a front wall of the face duct is bent in a shape of a crank as seen from a vehicle transverse direction, such that an upper portion of the front wall of the face duct projects out further toward a vehicle front side than a lower portion of the front wall.

* * * * *